US011064423B2

(12) United States Patent
Jain et al.

(10) Patent No.: US 11,064,423 B2
(45) Date of Patent: *Jul. 13, 2021

(54) SYSTEMS AND METHODS FOR WIRELESSLY MODIFYING DETECTION CHARACTERISTICS OF PORTABLE DEVICES

(71) Applicant: The Nielsen Company (US), LLC, New York, NY (US)

(72) Inventors: Anand Jain, Ellicott City, MD (US); John Stavropoulos, Edison, NJ (US); Alan Neuhauser, Silver Spring, MD (US); Wendell Lynch, East Lansing, MI (US); Vladimir Kuznetsov, Ellicott City, MD (US); Jack Crystal, Owings Mills, MD (US); David Gish, Riverdale, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,097

(22) Filed: Apr. 17, 2020

(65) Prior Publication Data
US 2020/0245225 A1 Jul. 30, 2020

Related U.S. Application Data

(63) Continuation of application No. 15/997,391, filed on Jun. 4, 2018, now Pat. No. 10,631,231, which is a
(Continued)

(51) Int. Cl.
H04B 7/00 (2006.01)
H04W 48/04 (2009.01)
(Continued)

(52) U.S. Cl.
CPC ....... *H04W 48/04* (2013.01); *H04M 1/72412* (2021.01); *H04N 21/00* (2013.01); *G06Q 30/02* (2013.01); *H04M 1/6008* (2013.01)

(58) Field of Classification Search
CPC ...... H04H 60/58; H04W 4/206; H04W 48/04; H04M 1/72412; H04M 1/6008; H04N 21/00; G06Q 30/02
(Continued)

(56) References Cited

U.S. PATENT DOCUMENTS 3,919,479 A 11/1975 Moon et al.
4,230,990 A 10/1980 Lert, Jr. et al.
(Continued)

FOREIGN PATENT DOCUMENTS

CN 1629870 6/2005
CN 1965335 5/2007
(Continued)

OTHER PUBLICATIONS

International Searching Authority, "International Search Report and Written Opinion", mailed in connection with International Application No. PCT/US2013/049120, dated Dec. 5, 2013 (16 pages).
(Continued)

*Primary Examiner* — Kathy W Wang-Hurst
*Assistant Examiner* — Max Mathew
(74) *Attorney, Agent, or Firm* — Hanley, Flight & Zimmerman, LLC

(57) ABSTRACT

Example systems, methods, apparatus and articles of manufacture for wirelessly modifying detection characteristics of portable devices are disclosed herein. Example portable devices disclosed here include a microphone and radio frequency circuitry to scan for a radio frequency beacon at a first scanning rate. Disclosed example apparatus also include a processor to trigger activation of audio monitoring,
(Continued)

in the portable device, of an audio signal obtained via the microphone. In some disclosed examples, the audio monitoring is to be triggered in response to a first connection being made via the radio frequency circuitry with a first transmitter of the radio frequency beacon. In some disclosed examples, the audio monitoring is to collect research data from the audio signal.

15 Claims, 8 Drawing Sheets

Related U.S. Application Data continuation of application No. 13/657,380, filed on Oct. 22, 2012, now Pat. No. 9,992,729.

(51) Int. Cl.
  *H04N 21/00* (2011.01)
  *H04M 1/72412* (2021.01)
  *H04M 1/60* (2006.01)
  *G06Q 30/02* (2012.01)

(58) Field of Classification Search
  USPC .............. 455/572–574, 161.1–169.1, 434
  See application file for complete search history.

(56) References Cited

U.S. PATENT DOCUMENTS

| | | |
|---|---|---|
| 4,626,904 A | 12/1986 | Lurie |
| 4,677,466 A | 6/1987 | Lert, Jr. et al. |
| 4,695,879 A | 9/1987 | Weinblatt |
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,930,011 A | 5/1990 | Kiewit |
| 4,931,865 A | 6/1990 | Scarampi |
| 4,955,070 A | 9/1990 | Welsh et al. |
| 4,973,952 A | 11/1990 | Malec et al. |
| 5,218,641 A | 6/1993 | Abe et al. |
| 5,289,526 A | 2/1994 | Chymyck et al. |
| 5,382,970 A | 1/1995 | Kiefl |
| 5,406,269 A | 4/1995 | Baran |
| 5,450,490 A | 9/1995 | Jensen et al. |
| 5,451,839 A | 9/1995 | Rappaport et al. |
| 5,457,807 A | 10/1995 | Weinblatt |
| 5,481,294 A | 1/1996 | Thomas et al. |
| 5,483,276 A | 1/1996 | Brooks et al. |
| 5,490,204 A | 2/1996 | Gulledge |
| 5,512,933 A | 4/1996 | Wheatley et al. |
| 5,546,444 A | 8/1996 | Roach, Jr. et al. |
| 5,561,835 A | 10/1996 | Worthy |
| 5,574,962 A | 11/1996 | Fardeau et al. |
| 5,579,124 A | 11/1996 | Aijala et al. |
| 5,581,800 A | 12/1996 | Fardeau et al. |
| 5,612,729 A | 3/1997 | Ellis et al. |
| 5,623,535 A | 4/1997 | Leung et al. |
| 5,644,623 A | 7/1997 | Gulledge |
| 5,754,956 A | 5/1998 | Abreu et al. |
| 5,764,763 A | 6/1998 | Jensen et al. |
| 5,768,680 A | 6/1998 | Thomas |
| 5,781,865 A | 7/1998 | Gammon |
| 5,784,442 A | 7/1998 | Foti |
| 5,787,334 A | 7/1998 | Fardeau et al. |
| 5,794,146 A * | 8/1998 | Sevcik .............. H04W 52/0241 455/434 |
| 5,822,410 A | 10/1998 | McCausland et al. |
| 5,826,164 A | 10/1998 | Weinblatt |
| 5,826,186 A | 10/1998 | Mitchell et al. |
| 5,839,050 A | 11/1998 | Baehr et al. |
| 5,896,554 A | 4/1999 | Itoh et al. |
| 6,006,085 A | 12/1999 | Balachandran |
| 6,049,713 A | 4/2000 | Tran et al. |
| 6,101,175 A | 8/2000 | Schorman et al. |
| 6,108,637 A | 8/2000 | Blumenau |
| 6,134,544 A | 10/2000 | Glitho et al. |
| 6,138,020 A | 10/2000 | Galyas et al. |
| 6,169,896 B1 | 1/2001 | Sant et al. |
| 6,212,386 B1 | 4/2001 | Briere et al. |
| 6,223,031 B1 | 4/2001 | Näslund |
| 6,329,908 B1 | 12/2001 | Frecksa |
| 6,421,434 B1 | 7/2002 | Rosu |
| 6,459,371 B1 | 10/2002 | Pike |
| 6,466,783 B2 | 10/2002 | Dahm et al. |
| 6,516,189 B1 | 2/2003 | Frangione et al. |
| 6,597,671 B1 | 7/2003 | Ahmadi et al. |
| 6,628,953 B1 | 9/2003 | Dillon et al. |
| 6,647,548 B1 | 11/2003 | Lu et al. |
| 6,717,547 B2 | 4/2004 | Spilker, Jr. et al. |
| 6,788,926 B1 | 9/2004 | Frangione et al. |
| 6,871,180 B1 | 3/2005 | Neuhauser |
| 6,934,508 B2 | 8/2005 | Ceresoli et al. |
| 6,999,715 B2 * | 2/2006 | Hayter .................. H04H 60/58 455/2.01 |
| 6,999,766 B1 | 2/2006 | Padovani |
| 7,013,136 B2 | 3/2006 | Frangione et al. |
| 7,130,622 B2 | 10/2006 | Vänskä et al. |
| 7,154,398 B2 * | 12/2006 | Chen ................... G08B 25/016 340/573.1 |
| 7,181,159 B2 | 2/2007 | Breen |
| 7,194,281 B2 | 3/2007 | Peng et al. |
| 7,203,510 B2 | 4/2007 | Tanoue |
| 7,340,214 B1 * | 3/2008 | Hamberg .......... H04L 29/06027 370/238 |
| 7,395,062 B1 | 7/2008 | Tuccio |
| 7,409,214 B2 | 8/2008 | Lee |
| 7,471,987 B2 | 12/2008 | Crystal et al. |
| 7,486,925 B2 | 2/2009 | Breen |
| 7,505,765 B2 | 3/2009 | Frangione et al. |
| 7,567,820 B2 * | 7/2009 | Bitran ............... H04W 52/0229 455/552.1 |
| 7,627,872 B2 | 12/2009 | Hebeler et al. |
| 7,640,141 B2 | 12/2009 | Kolessar et al. |
| 7,734,309 B2 | 6/2010 | Chi et al. |
| 7,885,239 B1 | 2/2011 | Oroskar et al. |
| 8,175,567 B2 * | 5/2012 | Hoefel .................. H04W 48/16 455/343.4 |
| 8,275,413 B1 | 9/2012 | Fraden et al. |
| 8,326,290 B2 * | 12/2012 | Mortti ................... H04W 48/16 455/434 |
| 8,417,296 B2 | 4/2013 | Caballero et al. |
| 8,447,293 B2 | 5/2013 | Stapleton et al. |
| 9,502,750 B2 | 11/2016 | Yarga et al. |
| 9,992,729 B2 * | 6/2018 | Jain ........................ H04N 21/00 |
| 2002/0055924 A1 | 5/2002 | Liming |
| 2002/0087974 A1 | 7/2002 | Sprague |
| 2002/0102993 A1 | 8/2002 | Hendrey et al. |
| 2002/0129138 A1 | 9/2002 | Carter |
| 2002/0155831 A1 | 10/2002 | Fodor et al. |
| 2002/0174222 A1 | 11/2002 | Cox |
| 2003/0064722 A1 | 4/2003 | Frangione et al. |
| 2003/0065805 A1 | 4/2003 | Barnes, Jr. |
| 2003/0101451 A1 | 5/2003 | Bentolila et al. |
| 2003/0136827 A1 | 7/2003 | Kaneko et al. |
| 2003/0170001 A1 | 9/2003 | Breen |
| 2003/0235180 A1 | 12/2003 | Oprescu-Surcobe et al. |
| 2004/0019675 A1 | 1/2004 | Hebeler, Jr. et al. |
| 2004/0122727 A1 | 6/2004 | Zhang et al. |
| 2004/0142693 A1 | 7/2004 | Feder et al. |
| 2004/0202131 A1 | 10/2004 | An et al. |
| 2005/0043046 A1 | 2/2005 | Lee |
| 2005/0200476 A1 | 9/2005 | Forr et al. |
| 2005/0203798 A1 | 9/2005 | Jensen et al. |
| 2005/0243784 A1 | 11/2005 | Fitzgerald et al. |
| 2005/0287954 A1 | 12/2005 | Lim et al. |
| 2006/0023642 A1 | 2/2006 | Roskowski |
| 2006/0089153 A1 | 4/2006 | Sheynblat |
| 2006/0107195 A1 | 5/2006 | Ramaswamy et al. |
| 2006/0270401 A1 | 11/2006 | Frangione et al. |
| 2006/0284981 A1 | 12/2006 | Erol et al. |
| 2007/0011268 A1 | 1/2007 | Banga et al. |

(56) References Cited

U.S. PATENT DOCUMENTS

| | | |
|---|---|---|
| 2007/0041344 A1 | 2/2007 | Yaqub et al. |
| 2007/0058678 A1 | 3/2007 | Thompson, III et al. |
| 2007/0060084 A1 | 3/2007 | Thompson, III et al. |
| 2007/0193438 A1 | 8/2007 | Asukai et al. |
| 2007/0243864 A1 | 10/2007 | Jaquet |
| 2008/0109295 A1 | 5/2008 | McConochie et al. |
| 2008/0262901 A1 | 10/2008 | Banga et al. |
| 2008/0299910 A1 | 12/2008 | Petersen et al. |
| 2009/0169024 A1 | 7/2009 | Krug et al. |
| 2009/0171767 A1 | 7/2009 | Kolessar |
| 2009/0187463 A1 | 7/2009 | DaCosta |
| 2009/0187593 A1 | 7/2009 | Chen et al. |
| 2009/0197582 A1 | 8/2009 | Lewis et al. |
| 2009/0254975 A1 | 10/2009 | Turnbull et al. |
| 2009/0258669 A1 | 10/2009 | Nie et al. |
| 2009/0298514 A1 | 12/2009 | Ullah |
| 2009/0311966 A1 | 12/2009 | Stapleton et al. |
| 2010/0169904 A1 | 7/2010 | Nielsen et al. |
| 2010/0195837 A1 | 8/2010 | Srinivasan et al. |
| 2010/0222687 A1 | 9/2010 | Thijs et al. |
| 2010/0228677 A1 | 9/2010 | Houston |
| 2010/0268540 A1 | 10/2010 | Arshi et al. |
| 2010/0291880 A1* | 11/2010 | Feldstein .................. H04B 1/40 455/73 |
| 2010/0317371 A1 | 12/2010 | Westerinen et al. |
| 2011/0099142 A1 | 4/2011 | Karjalainen et al. |
| 2011/0126222 A1 | 5/2011 | Wright et al. |
| 2011/0261257 A1 | 10/2011 | Terry et al. |
| 2011/0264663 A1 | 10/2011 | Verkasalo |
| 2011/0286632 A1 | 11/2011 | Tuxen et al. |
| 2011/0312308 A1 | 12/2011 | Willey |
| 2012/0003933 A1 | 1/2012 | Baker et al. |
| 2012/0029345 A1 | 2/2012 | Mahfouz et al. |
| 2012/0045994 A1* | 2/2012 | Koh .................. H04L 63/18 455/41.3 |
| 2012/0047011 A1 | 2/2012 | Rippetoe et al. |
| 2012/0144076 A1 | 6/2012 | Yang et al. |
| 2012/0245978 A1 | 9/2012 | Jain et al. |
| 2012/0290360 A1 | 11/2012 | Zhang et al. |
| 2012/0321101 A1 | 12/2012 | Lee |
| 2013/0035979 A1 | 2/2013 | Tenbrock |
| 2013/0103810 A1* | 4/2013 | Papakipos ............. H04W 4/025 709/221 |
| 2013/0107732 A1 | 5/2013 | O'Donnell et al. |
| 2013/0125183 A1 | 5/2013 | Gomez et al. |
| 2013/0183926 A1 | 7/2013 | Lindberg et al. |
| 2013/0204999 A1 | 8/2013 | Lindberg |
| 2013/0205311 A1 | 8/2013 | Ramaswamy et al. |
| 2013/0262184 A1 | 10/2013 | Jain et al. |
| 2013/0290234 A1* | 10/2013 | Harris .................... G06N 5/022 706/46 |
| 2013/0308506 A1* | 11/2013 | Kim .................... H04W 76/14 370/310 |
| 2014/0018034 A1 | 1/2014 | Lindberg |
| 2014/0108935 A1* | 4/2014 | Yuen .................... G06F 3/167 715/728 |
| 2014/0111698 A1 | 4/2014 | Jain et al. |
| 2014/0113557 A1 | 4/2014 | Jain et al. |
| 2014/0187268 A1 | 7/2014 | Browne et al. |
| 2014/0289611 A1* | 9/2014 | Norwood ............. G06F 40/169 715/234 |
| 2014/0355588 A1 | 12/2014 | Cho et al. |
| 2016/0191619 A1 | 6/2016 | Wang |
| 2016/0292461 A1 | 10/2016 | Yan et al. |
| 2016/0374608 A1 | 12/2016 | Dugan |
| 2018/0288677 A1 | 10/2018 | Jain et al. |

FOREIGN PATENT DOCUMENTS

| | | |
|---|---|---|
| EP | 231427 | 12/1987 |
| EP | 895435 | 2/1999 |
| EP | 1011283 | 6/2000 |
| EP | 1026847 | 8/2000 |
| EP | 1133090 | 9/2001 |
| EP | 1892638 | 2/2008 |
| GB | 2426153 | 11/2006 |
| JP | 9312870 | 12/1997 |
| KR | 101071540 | 10/2011 |
| WO | 9111062 | 7/1991 |
| WO | 9533352 | 12/1995 |
| WO | 9641492 | 12/1996 |
| WO | 9833344 | 7/1998 |
| WO | 9837724 | 8/1998 |
| WO | 9853621 | 11/1998 |
| WO | 0072289 | 11/2000 |
| WO | 0072309 | 11/2000 |
| WO | 0205577 | 1/2002 |
| WO | 0211123 | 2/2002 |
| WO | 03077455 | 9/2003 |
| WO | 2007044356 | 4/2007 |
| WO | 2008008899 | 1/2008 |
| WO | 2008118119 | 10/2008 |
| WO | 2009046430 | 4/2009 |
| WO | 2011103660 | 9/2011 |
| WO | 2011161303 | 12/2011 |
| WO | 2014065903 | 5/2014 |

OTHER PUBLICATIONS

Dolcera Wiki, "CDMA Basics," Jul. 29, 2007, retrieved from <http://www.dolcera.com/wiki/index.php?title-CDMA_Basics>, on Feb. 21, 2008 (9 pages).

Geckobeach, "How to Interpret the Cellular/Mobile Equipment Maps," Feb. 21, 2008, retrieved from <http://www.geckobeach.com/cellular/maps/mapfaqs.php>, on Feb. 21, 2008 (4 pages).

Google, "Google Announces Launch of Google Maps for Mobile with 'My Location' Technology," Nov. 28, 2007, retrieved from <http://www.google.com/intl/en/press/annc/20081128_maps_mobile_my_loca-tion_technology> on Feb. 28, 2008 (1 page).

United States Patent and Trademark Office, "Final Office Action," mailed in connection with U.S. Appl. No. 13/731,882, dated Aug. 10, 2015 (32 pages).

Canadian Intellectual Property Office, "Office Action", mailed in connection with Canadian Patent Application No. 2,875,286, dated Dec. 17, 2015 (4 pages).

International Searching Authority, "International Preliminary Report on Patentability", mailed in connection with International Patent Application No. PCT/US2013/049120, dated Jun. 2, 2015 (10 pages).

United States Patent and Trademark Office, "Non-Final Office Action," mailed in connection with U.S. Appl. No. 13/729,889, dated Jan. 14, 2015 (25 pages).

United States Patent and Trademark Office, "Non-Final Office Action," mailed in connection with U.S. Appl. No. 13/657,380, dated Jul. 25, 2014 (14 pages).

United States Patent and Trademark Office, "Final Office Action," mailed in connection with U.S. Appl. No. 13/657,380, dated Dec. 29, 2014 (18 pages).

Kolessar et al., "Portable People Meters, a Report on the Large Scale Field Test of Portable People Meters in Manchester, England," 2000 (18 pages).

United States Patent and Trademark Office, "Non-Final Office Action", mailed in connection with U.S. Appl. No. 13/731,882, dated Jan. 14, 2015 (31 pages).

United States Patent and Trademark Office, "Non-Final Office Action", mailed in connection with U.S. Appl. No. 13/729,889, dated Jan. 23, 2015 (27 pages).

United States Patent and Trademark Office, "Final Office Action", mailed in connection with U.S. Appl. No. 13/729,889, dated Jul. 14, 2015 (50 pages).

European Patent Office, "European Search Report", mailed in connection with European Patent Application No. 13848606.3, dated Jun. 13, 2016 (14 pages).

United States Patent and Trademark Office, "Non-Final Office Action", mailed in connection with U.S. Appl. No. 13/731,882, dated Sep. 15, 2016 (46 pages).

(56) References Cited

OTHER PUBLICATIONS

Canadian Patent Office, "Office Action", mailed in connection with Canadian Patent Application No. 2,875,286, dated Nov. 23, 2016 (3 pages).

United States Patent and Trademark Office, "Final Office Action," mailed in connection with U.S. Appl. No. 13/731,882, dated Feb. 24, 2017 (42 pages).

United States Patent and Trademark Office, "Non-Final Office Action," mailed in connection with U.S. Appl. No. 13/729,889, dated May 19, 2016 (43 pages).

United States Patent and Trademark Office, "Final Office Action," mailed in connection with U.S. Appl. No. 13/729,889, dated Nov. 14, 2016 (34 pages).

The State Intellectual Property Office of China, "First Notification of Office Action," mailed in connection with Chinese Patent Application No. 201380029274.7, dated Feb. 14, 2018 (12 pages).

European Patent Office, "Communication under Rule 71(3) EPC," mailed in connection with European Patent Application No. 13848606.3, dated Aug. 7, 2018 (42 pages).

United States Patent and Trademark Office, "Notice of Allowance," mailed in connection with U.S. Appl. No. 13/657,380, dated Jan. 26, 2018 (8 pages).

United States Patent and Trademark Office, "Notice of Allowance," mailed in connection with U.S. Appl. No. 13/657,380, dated Sep. 29, 2017 (9 pages).

United States Patent and Trademark Office, "Notice of Allowance," mailed in connection with U.S. Appl. No. 13/657,380, dated Apr. 6, 2017 (8 pages).

United States Patent and Trademark Office, "Final Office Action," mailed in connection with U.S. Appl. No. 13/657,380, dated Apr. 21, 2016 (21 pages).

United States Patent and Trademark Office, "Non-final Office Action," mailed in connection with U.S. Appl. No. 13/657,380, dated Aug. 27, 2015 (20 pages).

United States Patent and Trademark Office, "Final Office Action," mailed in connection with U.S. Appl. No. 13/657,380, dated Dec. 29, 2014 (19 pages).

United States Patent and Trademark Office, "Non-final Office Action," mailed in connection with U.S. Appl. No. 13/657,380, dated Jul. 25, 2014 (15 pages).

State Intellectual Property Office of China, "Notice of Decision of Granting Patent Right for Invention," mailed in connection with Chinese Patent Application No. 201380029274.7, dated Feb. 20, 2019 (5 pages).

State Intellectual Property Office of China, "Second Notification of Office Action," mailed in connection with Chinese Patent Application No. 201380029274.7, dated Nov. 2, 2018 (7 pages).

United States Patent and Trademark Office, "Notice of Allowance," mailed in connection with U.S. Appl. No. 15/997,391, dated Dec. 16, 2019 (9 pages).

United States Patent and Trademark Office, "Non-final Office Action," mailed in connection with U.S. Appl. No. 15/997,391, dated May 21, 2019 (14 pages).

United States Patent and Trademark Office, "Non-final Office Action," mailed in connection with U.S. Appl. No. 15/997,391, dated Oct. 31, 2018 (16 pages).

* cited by examiner

SYSTEMS AND METHODS FOR WIRELESSLY MODIFYING DETECTION CHARACTERISTICS OF PORTABLE DEVICES

RELATED APPLICATION(S)

This patent arises from a continuation of U.S. patent application Ser. No. 15/997,391, which is entitled "SYSTEMS AND METHODS FOR WIRELESSLY MODIFYING DETECTION CHARACTERISTICS OF PORTABLE DEVICES," and which was filed on Jun. 4, 2018, which is a continuation of U.S. patent application Ser. No. 13/657,380, which is entitled "SYSTEMS AND METHODS FOR WIRELESSLY MODIFYING DETECTION CHARACTERISTICS OF PORTABLE DEVICES," and which was filed on Oct. 22, 2012. Priority to U.S. patent application Ser. No. 15/997,391 and U.S. patent application Ser. No. 13/657,380 is claimed. U.S. patent application Ser. No. 15/997,391 and U.S. patent application Ser. No. 13/657,380 are hereby incorporated by reference in their respective entireties.

TECHNICAL FIELD

The present disclosure is directed to processor-based audience analytics. More specifically, the disclosure describes systems and methods for utilizing wireless data signals to control and/or regulate data scanning and retrieval, as well as audio monitoring.

BACKGROUND INFORMATION

Wireless technology such as Bluetooth and Wi-Fi has become an important part of data transfer for portable processing devices. Bluetooth is a proprietary open wireless technology standard for exchanging data over short distances from fixed and mobile devices, creating personal area networks (PANs) with high levels of security. Bluetooth uses a radio technology called frequency-hopping spread spectrum, which divides the data being sent and transmits portions of it on up to 79 bands (1 MHz each, preferably centered from 2402 to 2480 MHz) in the range 2,400-2,483.5 MHz (allowing for guard bands). This range is in the globally unlicensed Industrial, Scientific and Medical (ISM) 2.4 GHz short-range radio frequency band. Gaussian frequency-shift keying (GFSK) modulation may be used, however, more advanced techniques, such as $\pi/4$-DQPSK and 8DPSK modulation may also be used between compatible devices. Devices functioning with GFSK are said to be operating in "basic rate" (BR) mode where an instantaneous data rate of 1 Mbit/s is possible. "Enhanced Data Rate" (EDR) is used to describe $\pi/4$-DPSK and 8DPSK schemes, each giving 2 and 3 Mbit/s respectively. The combination of these (BR and EDR) modes in Bluetooth radio technology is classified as a "BR/EDR radio".

Bluetooth is a packet-based protocol with a master-slave structure. One master may communicate with up to 7 slaves in a piconet, where all devices preferably share the master's clock. Packet exchange is based on the basic clock, defined by the master, which may tick at 312.5 μs intervals. In the simple example of single-slot packets, the master transmits in even slots and receives in odd slots; the slave, conversely, receives in even slots and transmits in odd slots. Packets may be 1, 3 or 5 slots long but in all cases the master transmit will begin in even slots and the slave transmit in odd slots.

Bluetooth provides a secure way to connect and exchange information between devices such as faxes, mobile phones, telephones, laptops, personal computers, printers, Global Positioning System (GPS) receivers, digital cameras, and video game consoles. At any given time, data can be transferred between the master and one other device. The master may choose which slave device to address and may switch rapidly from one device to another in a round-robin fashion. In the area of computer processors, Bluetooth is commonly used to operationally link devices to the computer processor. In other cases, Bluetooth signals are used to "unlock" a computer processor when an enabled device is within a certain proximity.

One area where improvements are needed is in the area of media exposure tracking and web analytics. To date, Bluetooth has been relatively underutilized in this area. What is needed are methods, systems and apparatuses for utilizing Bluetooth signal characteristics in conjunction with media exposure data to produce research data that accurately identifies and characterizes devices, and their accompanying users. Additionally, it has been found that Bluetooth and Wifi communications may be used to advantageously control functions of portable wireless devices to provide efficient operations for one or multiple devices.

SUMMARY

Accordingly, apparatuses, systems and methods are disclosed for computer-implemented techniques for modifying operation of a portable processing device configured to scan for wireless signals under a first scan rate. Under one exemplary embodiment, a first wireless signal is received in the portable processing device and a characteristic of the first wireless signal is determined. The characteristic is then processed to determine if it conforms with a predetermined characteristic. The operation of the portable processing device is then modified if the processing step determines that the characteristic conforms with the predetermined characteristic, wherein the modification comprises at least one of (i) modifying the first scan rate to a second scan rate, the second scan rate being different from the first, and (ii) activating monitoring capabilities in the portable processing device to collect research data on media data.

Under another exemplary embodiment, a portable processing device is configured to scan for wireless signals under a first scan rate, comprising: a memory; a microphone operatively coupled to the memory; an input operatively coupled to the memory, wherein the input is configured to receive a first wireless signal; and a processor, operatively coupled to the input, wherein the processor is configured to determine a characteristic of the first wireless signal and process the characteristic to determine if it conforms with a predetermined characteristic, and wherein the processor is further configured to modify the operation of the portable processing device if the characteristic conforms with the predetermined characteristic, wherein the modification comprises at least one of (i) modifying the first scan rate to a second scan rate, the second scan rate being different from the first, and (ii) activating monitoring capabilities in the portable processing device to collect research data on media data received via the microphone.

Under yet another embodiment, a computer-implemented method is disclosed for modifying operation of a portable processing device, where the method comprises the steps of configuring the device to execute a first scan rate for detecting wireless signals; receiving a first wireless signal in the portable processing device; determining a characteristic of the first wireless signal; processing the characteristic to determine if it conforms with a predetermined characteristic;

detecting the presence of media data in the portable processing device; and modifying the operation of the portable processing device if the processing step determines that the characteristic conforms with the predetermined characteristic, wherein the modification comprises at least one of (i) modifying the first scan rate to a second scan rate, the second scan rate being different from the first, and (ii) activating monitoring capabilities in the portable processing device to collect research data on the media data.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
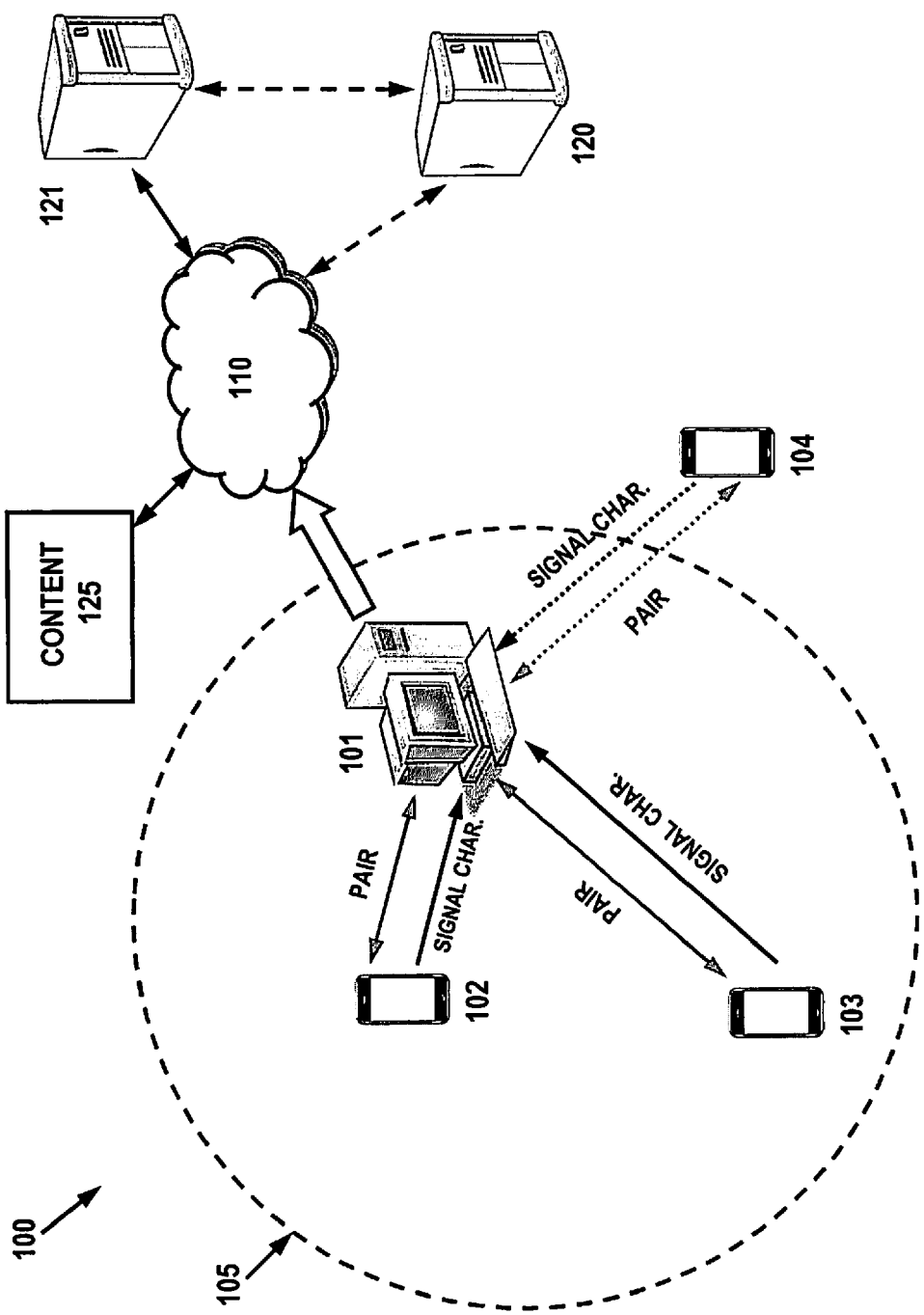
FIG. 1 illustrates an exemplary system under one embodiment, where media data is provided from a network to a processing device in the vicinity of a plurality of portable devices.

The present disclosure generally deals with the collection of research data relating to media and media data from portable computing devices using wireless technologies, such as Bluetooth and Wi-Fi. Additionally, the present disclosure deals with configuring portable computing devices for the collection of research data using wireless technologies. Regarding collection of research data, FIG. 1 illustrates an exemplary system 100 that comprises a computer processing device 101 and a plurality of portable computing devices (102-104) that are in the vicinity of processing device 101. In this example, processing device 101 is illustrated as a personal computer, while portable computing devices 102-104 are illustrated as Bluetooth-enabled, Wi-Fi-enabled, or other wirelessly-enabled cell phones. One example of a portable computing device is illustrated below in connection with FIG. 6. It is understood by those skilled in the art that other similar devices may be used as well. For example, processing device 101 may also be a laptop, a computer tablet, a set-top box, a media player, a network-enabled television or DVD player, and the like. Portable computing devices 102-104 may also be laptops, PDAs, tablet computers, Personal People Meters™ (PPMs), wireless telephone, etc.

Under a preferred embodiment, processing device 101 connects to content source 125 via network 110 to obtain media data. The terms "media data" and "media" as used herein mean data which is widely accessible, whether over-the-air, or via cable, satellite, network, internetwork (including the Internet), displayed, distributed on storage media, or by any other means or technique that is humanly perceptible, without regard to the form or content of such data, and including but not limited to audio, video, audio/video, text, images, animations, databases, broadcasts, displays (including but not limited to video displays), web pages and streaming media. As media is received on processing device 101, analytics software residing on processing device 101 collects information relating to media data received from content source 125, and additionally may collect data relating to network 110.

Data relating to the media data may include a "cookie", also known as an HTTP cookie, which can provide state information (memory of previous events) from a user's browser and return the state information to a collecting site, which may be the content source 125 or collection site 121 (or both). The state information can be used for identification of a user session, authentication, user's preferences, shopping cart contents, or anything else that can be accomplished through storing text data on the user's computer.

Referring back to the example of FIG. 1, media data is received on processing device 101. At the time the media data is received, portable computing devices 102-104 are in the vicinity, and are configured to establish Bluetooth communication ("pair") with processing device 101. After Bluetooth communications are established, processing device 101 collects the Bluetooth signal characteristics from each portable computing device. Under a preferred embodiment, Bluetooth signal characteristics relate to status parameters of a Bluetooth connection together with any other signal strength values made available in Bluetooth Core Specification. The Host Controller Interface (HCI) (discussed in greater detail below) provides access to three such connection status parameters, including Link Quality (LQ), Received Signal Strength Indicator (RSSI), and Transmit Power Level (TPL). All these status parameters require the establishment of an active Bluetooth connection in order to be measured. Another signal parameter, referred to as "Inquiry Result with RSSI", alternately also be used, where the parameter perceives RSSI from the responses sent by its nearby devices.

Briefly, Link Quality (LQ) is an 8-bit unsigned integer that evaluates the perceived link quality at the receiver. It ranges from 0 to 255, where the larger the value, the better the link's state. For most Bluetooth modules, it is derived from the average bit error rate (BER) seen at the receiver, and is constantly updated as packets are received. Received Signal Strength Indicator (RSSI) is an 8-bit signed integer that denotes received (RX) power levels and may further denote if the level is within or above/below the Golden Receiver Power Range (GRPR), which is regarded as the ideal RX power range. As a simplified example, when multipath propagation is present, RSSI is generally based on a line-of-sight (LOS) field strength and a reflected signal strength, where the overall strength is proportional to the magnitude of the electromagnetic wave's E-field. Thus, when there is minimal reflective interference, RSSI may be determined by 20 log (LOS+RS), where LOS is the line-of-sight signal strength and RS is the reflected signal. When reflective interference is introduced RSSI becomes 20 log (LOS−RS).

Transmit Power Level (TPL) is an 8-bit signed integer which specifies the Bluetooth module's transmit power level (in dBm). Although there are instances when a transmitter will use its device-specific default power setting to instigate or answer inquiries, its TPL may vary during a connection due to possible power control. "Inquiry Result with RSSI" works in a similar manner as a typical inquiry. In addition to the other parameters (e.g., Bluetooth device address, clock offset) generally retrieved by a normal inquiry, it also provides the RSSI value. Since it requires no active connection, the radio layer simply monitors the RX power level of the current inquiry response from a nearby device, and infers the corresponding RSSI.

For system 100, transmission may occur from direct voltage controlled oscillator (VCO) modulation to IQ mixing at the final radio frequency (RF). In the receiver, a conventional frequency discriminator or IQ down-conversion combined with analog-to-digital conversion is used. The Bluetooth configuration for each of the portable computing devices 102-104 and processing device 101 include a radio unit, a baseband link control unit, and link management software. Higher-level software utilities focusing on interoperability features and functionality are included as well. Enhanced Data Rate (EDR) functionalities may also be used to incorporate phase shift keying (PSK) modulation scheme to achieve a data rate of 2 or 3 Mb/s. It allows greater possibilities for using multiple devices on the same connection because of the increased bandwidth. Due to EDR having a reduced duty cycle, there is lower power consumption compared to a standard Bluetooth link.

As mentioned above, processing device 101 collects the Bluetooth signal characteristics from each portable computing device (102-104). At the same time, processing device 101 is equipped with software and/or hardware allowing it to measure media data exposure for a given period of time (e.g., digital signage, QR scan, a web browsing session, etc.) to produce research data. The term "research data" as used herein means data comprising (1) data concerning usage of media data, (2) data concerning exposure to media data, and/or (3) market research data. Under a preferred embodiment, when processing device 101 detects media data activity, it triggers a timer task to run for a predetermined period of time (e.g., X minutes) until the activity is over. At this time, discovery of paired devices is performed to locate each of the paired devices. Preferably, the UIDs of each device is known in advance. For each device discovered and paired, processing device 101 records each Bluetooth signal characteristic for the connection until the end of the session. Afterwards, the signal characteristics collected for each device, and the resultant research data for the session is forwarded to collection server 121 for further processing and/or analysis. Collection server 121 may further be communicatively coupled to server 120 which may be configured to provide further processing and/or analysis, generate reports, provide content back to processing device 101, and other functions. Of course, these functions can readily be incorporated into collection server 121, depending on the needs and requirements of the designer.

Figure 2:
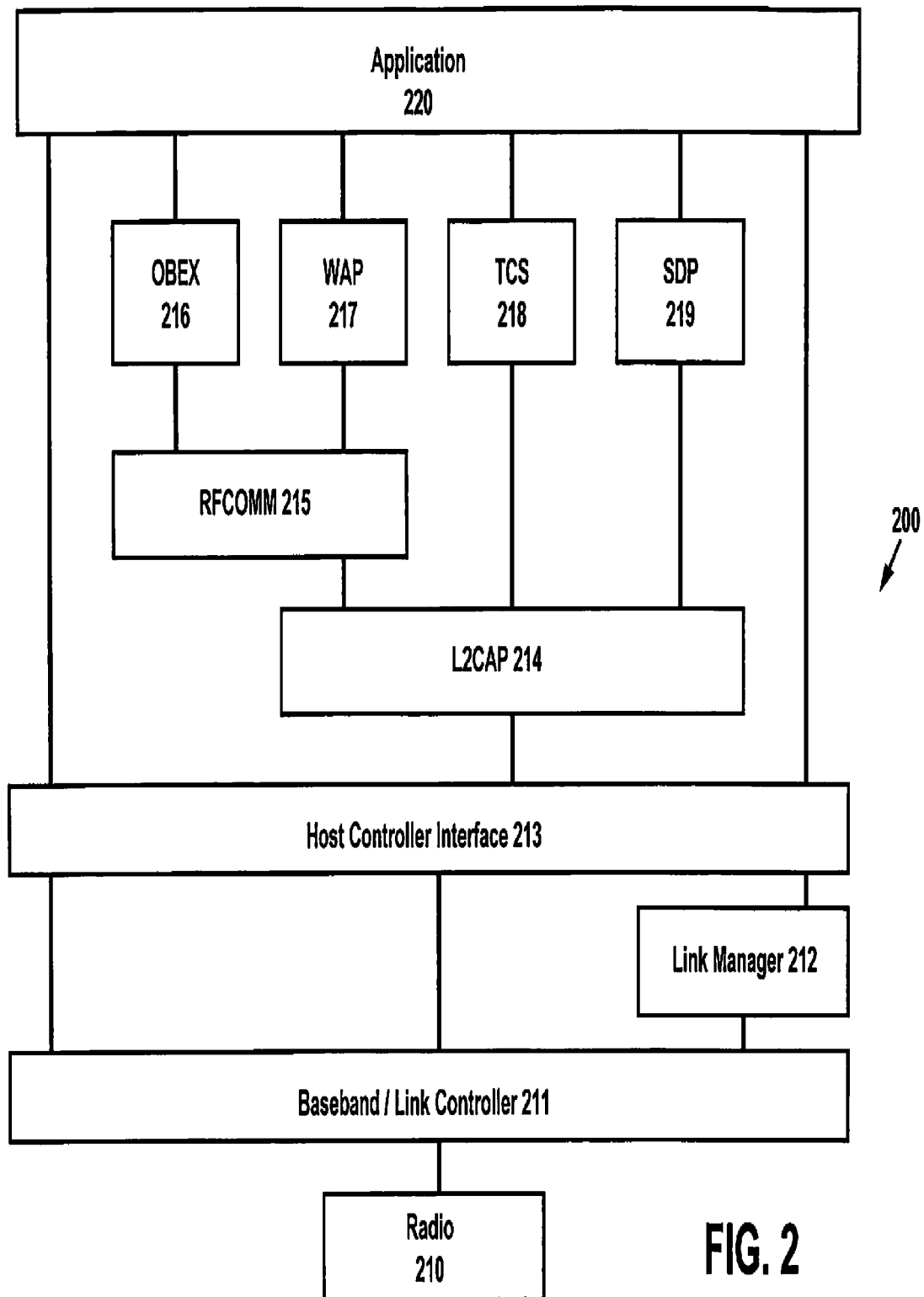
FIG. 2 illustrates an exemplary Bluetooth protocol stack utilized for communication.

FIG. 2 shows an exemplary Bluetooth protocol stack utilized for communication in the embodiment of FIG. 1. Generally, the transition from implementation in hardware and firmware (lower layers) to software (higher layers). If each of these groups of layers are separate entities, such as a PC card and laptop computer, then they can communicate with each other through Host Controller Interface 213 (HCI), which provides paths for data, audio, and control signals between the Bluetooth module and host.

Radio 210 completes the physical layer by providing a transmitter and receiver for two-way communication. Data packets are assembled and fed to the radio 210 by the baseband/link controller 211. The link controller of 211 provides more complex state operations, such as the standby, connect, and low-power modes. The baseband and link controller functions are combined into one layer to be consistent with their treatment in the Bluetooth Specification. Link manager 212 provides link control and configuration through a low-level language called the link manager protocol (LMP).

Logical link control and adaptation protocol (L2CAP) 214 establishes virtual channels between hosts that can keep track of several simultaneous sessions such as multiple file transfers. L2CAP 214 also takes application data and breaks it into Bluetooth-size portions for transmission, and reverses the process for received data. Radio Frequency Communication (RFCOMM) 215 is a Bluetooth serial port emulator, and its main purpose is to "trick" application 220 into thinking that a wired serial port exists instead of an RF link. Finally, various software programs that are needed for different Bluetooth usage models enable resident application 220 to use Bluetooth. These include service discovery protocol (SDP) 219, object exchange (OBEX), 216 telephony control protocol specification (TCS) 218, and Wireless Application Protocol (WAP) 217. Bluetooth radio 210 and baseband/link controller 211 consist of hardware that is typically available as one or two integrated circuits. Firmware-based link manager 212 and one end of the host controller interface 213, perhaps with a bus driver for connection to the host, complete the Bluetooth module shown in FIG. 2. The remaining parts of tile protocol stack and the host end of HCI 213 can be implemented in software on the host itself.

Figure 3:
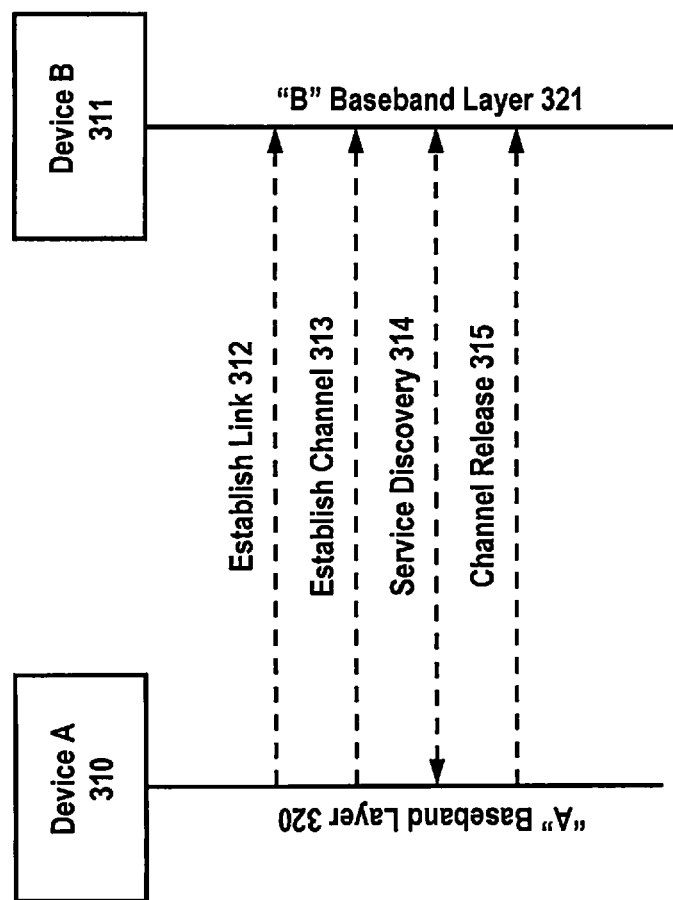
FIG. 3 illustrates an exemplary service discovery process.

FIG. 3 illustrates an exemplary Bluetooth discovery process utilizing "Device A" 310 and "Device B" 311 using each respective baseband layer (320, 321). Here, Device A 310 is initiating service discover while Device B 311 establishes communications in order to make it discoverable. The process may be assisted using a service discovery application from an access profile stored in each device.

The initial linking process 312 begins with an inquiry and page among devices in order to establish a piconet. In FIG. 3, Device A 310 is configured as a prospective slave (p-slave) and Device B 311 is a prospective master (p-master). As a p-master, Device B 311 must send its frequency hop synchronization (FHS) packet to a Device A 310 so the latter can use the same hop sequence and phase used by the master. Preferably, a predetermined hop sequence or set of sequences, are used for paging and inquiries. For inquiries, the p-master may not know about nearby devices, so a single common hop sequence (one sequence for sending an inquiry and another for responding to the inquiry) is used by all devices for initial device discovery. A p-slave responding to an inquiry sends its FHS packet, within which is its Bluetooth device address (BD_ADDR) which may be used for further piconet and scatternet identification. Now the p-master can create a new hopping sequence based the BD_ADDR for transmitting a subsequent page for establishing a piconet with that p-slave.

Inquiries that are sent and replied by a device are typically transmitted at a device-specific default power setting. As a result, signal characteristics, such RSSI collected through an inquiry is relatively free from the side-effect of power control. Accordingly, a inquiry fetched RSSI may provide finer measurements than the connection-based RSSI.

For establishing channel 313, a hop channel set and the sequence of hops through the channel set may be determined by the lower 28 bits of a device's BD_ADDR, and the hop phase may be determined by the 27 most significant bits of CLK. These two values are sent to a hop generator, and the output of this generator goes to the Bluetooth radio's frequency synthesizer. In order to establish communications, Devices A and B should use the same hop channels, the same hop sequence from channel to channel, and the same phase so that they hop together. Also, one device should transmit while the other receives on the same frequency and vice versa. Multiple hop sequences and periods are configured to cover inquiry, page, and connect activity. These include channel hop sequence (used for normal piconet communications between master and slave(s)), page hop sequence (used by a p-master to send a page to a specific p-slave and to respond to the slave's reply), page response sequence (used by a p-slave to respond to a p-master's page), inquiry hop sequence (used by a p-master to send an inquiry to find Bluetooth devices in range), and inquiry response sequence (used by a p-slave to respond to a p-master's inquiry).

Service discovery 314 is used for retrieving information required to set up a transport service or usage scenario, and may also be used to access a device and retrieve its capabilities or to access a specific application and find devices that support that application. Retrieving capabilities requires paging a device and forming an Asynchronous Connectionless Link (ACL) to retrieve the desired information, accessing applications involves connecting to and retrieving information from several devices that are discovered via an inquiry. Thus, service discovery may be used for browsing for services on a particular device, searching for and discovering services based upon desired attributes, and/or incrementally searching a device's service list to limit the amount of data to be exchanged. An L2CAP channel with a protocol service multiplexer (PSM) is used for the exchange of service-related information. Service discovery can have both client and server implementations, with at most one service discovery server on any one device. However, if a device is client only, then it need not have a service discovery server. Each service is preferably listed in the device's SOP database as a service record having a unique ServiceRecordHandle, and each attribute of the service record is given an attribute ID and an attribute value. Attributes include the various classes, descriptors, and names associated with the service record. After service discovery is completed, the channel is released 315.

Figure 4:
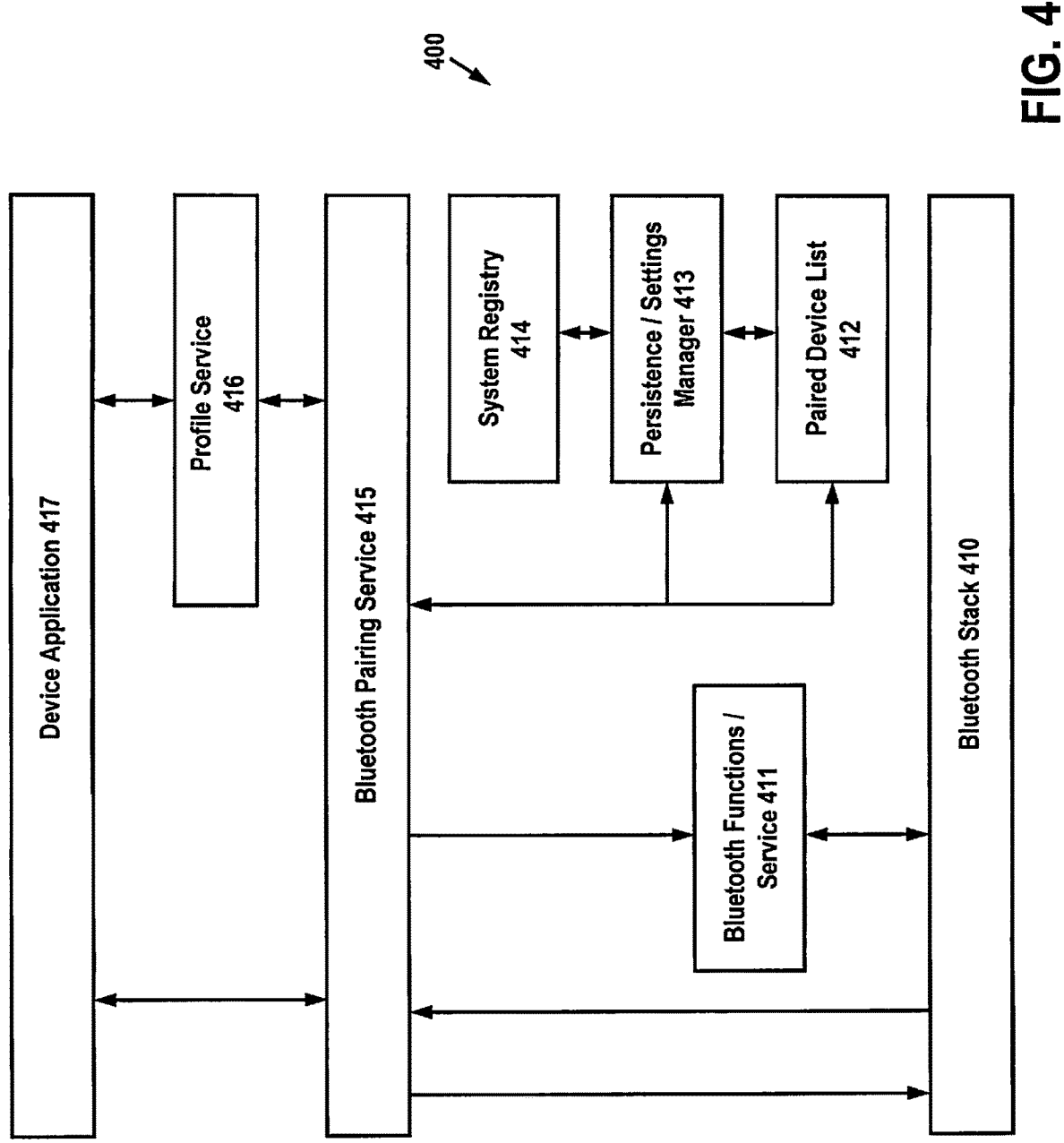
FIG. 4 illustrates an exemplary authentication mechanism for connected devices.

FIG. 4 illustrates an exemplary authentication configuration 400, where Bluetooth Pairing Service 415 sends API calls to Bluetooth Stack 410 and receives back pairing events. Bluetooth Stack 410 transmits API calls to Bluetooth helper service/function 411, which receives discovery enable signals (inquiry, page scan) from Bluetooth Pairing Service 415. Bluetooth pairing information for Pairing Service 415 is communicated from persistence/settings manager 413 and paired device list 412, which preferably retries information from system registry 414. Bluetooth Pairing Service 415 forwards information to device application 417, and may further retrieve and communicate profile services 416 to application 417 as well.

The authentication process verifies the identity of the device at the other end of a link. The verifier queries the claimant and checks its response; if correct, then authentication is successful. Authorization can be used to grant access to all services, a subset of services, or to some services when authentication is successful, but requires additional authentication based on some user input at the client device for further services. The last item is usually implemented at the application layer. For Bluetooth Pairing Services 415, two devices become paired when they start with the same PIN and generate the same link key, and then use this key for authenticating at least a current communication session. The session can exist for the life of a L2CAP link (for Mode 2 security) or the life of the ACL link (for Mode 3 security). Pairing can occur through an automatic authentication process if both devices already have the same stored PIN from which they can derive the same link keys for authentication. Alternatively, either or both applications can ask their respective users for manual PIN entry. Once devices are paired they can either store their link keys for use in subsequent authentications or discard them and repeat the pairing process each time they connect. If the link keys are stored, then the devices are "bonded," enabling future authentications to occur using the same link keys and without requiring the user to input the PIN again. The concept of "trust" applies to a device's authorization to access certain services on another device. A trusted device is previously authenticated and, based upon that authentication, has authorization to access various services. An untrusted device may be authenticated, but further action is needed, such as user intervention with a password, before authorization is granted to access services. Also, encryption may be used to further enhance security of connections.

Figure 5:
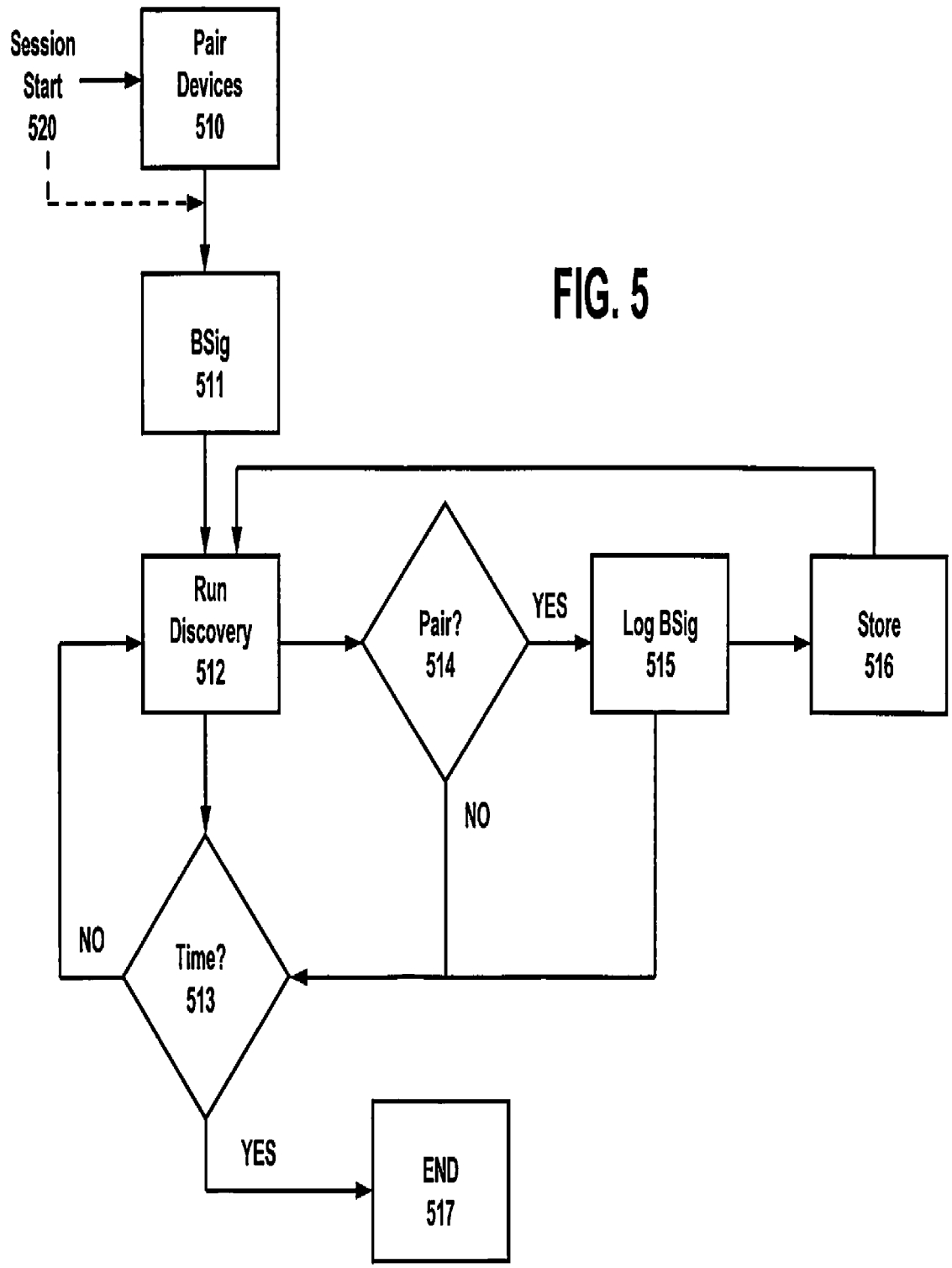
FIG. 5 is an exemplary flowchart for monitoring an RSSI Bluetooth signal characteristic.

FIG. 5 discloses one exemplary process for linking exposure to media data utilizing Bluetooth signal characteristics described above. In the beginning, a web session 520 starts, which triggers Bluetooth pairing of nearby devices 510. Once paired, the Bluetooth signal characteristics 511 ("BSig") are initially received. In the event that devices are already paired and/or bonded, the process starts by acquiring Bluetooth signal characteristics 511. Afterwards, a discovery process is run 512 for retrieving information for transport service or usage scenario, and may also be used to access a device and retrieve its capabilities or to access a specific application and find devices that support that application. Under one embodiment, a timer is used for media data exposure, wherein the timer can be set for specific time periods, or may alternately be set and used to correspond with web sessions or other events. When the timer 513 runs out, the process ends in 517. Otherwise, the process moves to 514, where the pairing is validated to ensure that a Bluetooth device is not moving out of range or otherwise compromising the connection. If the pairing validation produces a negative result, the process continues to look for the device via 512 for the time period 513. If the pairing validation is affirmative, the Bluetooth signal characteristics are logged 515 and stored 516 for the duration of the measurement (513). It should be understood that BSig block 515 may include Received Signal Strength Indicator (RSSI) value, a Transmit Power Level (TPL) value and/or a Link Quality (LQ) value.

It is understood that the examples above are provided as examples, and are not intended to be limiting in any way. Under an alternate embodiment, Bluetooth signal strengths may be approximated to determine distance. As explained above, an RSSI value provides the distance between the received signal strength and an optimal receiver power rank referred to as the "golden receiver power rank." The golden receiver power rank is limited by two thresholds. The lower threshold may be defined by an offset of 6 dB to the actual sensitivity of the receiver. The maximum of this value is predefined by −56 dBm. The upper threshold may be 20 dB over the lower one, where the accuracy of the upper threshold is about ±6 dB. Where S is assigned as the received signal strength, the value of S is determined by: (1) $S=RSSI+T_U$, for RSSI>0 and (2) $S=RSSI-T_L$, for RSSI<0, where $T_U=T_L+20$ DdB. Here, $T_U$ refers to the upper threshold, and $T_L$ refers to the lower threshold. The definition of the Bluetooth golden receiver limits the measurement of the RSSI to a distance. In order to measure the most unique characteristics of the signal, only measurements that result in a positive range of the RSSI should be considered for a functional approximation. The approximation may be calculated by choosing the best fitted function given by determining and minimizing the parameters of a least square sum of the signal strength measurements.

With regard to media data exposure measurement, the preferred embodiment collects research data on a computer processing device, associates it with the collected Bluetooth signal characteristics, and (a) transmits the research data and Bluetooth signal characteristics to a remote server(s) (e.g., collection server 121) for processing, (b) performs processing of the research data and Bluetooth signal characteristics in the computer processing device itself and communicates the results to the remote server(s), or (c) distributes association/processing of the research data and Bluetooth signal characteristics between the computer processing device and the remote server(s).

Under another embodiment, one or more remote servers are responsible for collecting research data on media data exposure. When Bluetooth signal characteristics are received from a computer processing device, the signal characteristics are associated with the research data (e.g., using time stamps) and processed. This embodiment is particularly advantageous when remote media data exposure techniques are used to produce research data. One technique, referred to as "logfile analysis," reads the logfiles in which a web server records all its transactions. A second technique, referred to as "page tagging," uses JavaScript on each page to notify a third-party server when a page is rendered by a web browser. Both collect data that can be processed to produce web traffic reports together with the Bluetooth signal characteristics. In certain cases, collecting web site data using a third-party data collection server (or even an in-house data collection server) requires an additional DNS look-up by the user's computer to determine the IP address of the collection server. As an alternative to logfile analysis and page tagging, "call backs" to the server from the rendered page may be used to produce research data. In this case, when the page is rendered on the web browser, a piece of Ajax code calls to the server (XMLHttpRequest) and passes information about the client that can then be aggregated.

Figure 6:
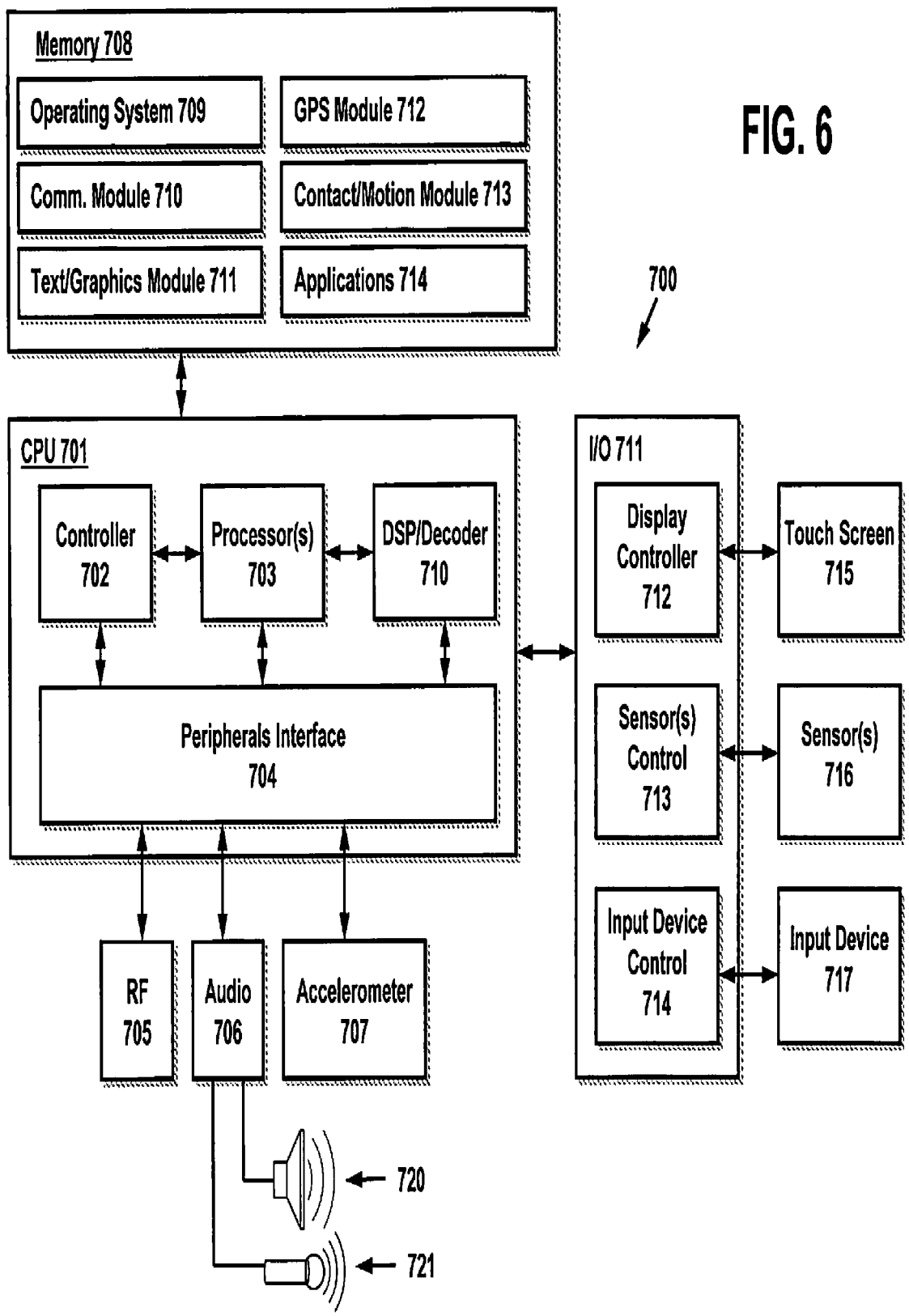
FIG. 6 illustrates an exemplary block diagram of a portable device utilized in the present disclosure.

FIG. 6 is an exemplary embodiment of a portable computing device 700 which may function as a mobile terminal (e.g., see FIGS. 1 and 8, below), and may be a smart phone, tablet computer, or the like. Device 700 may include a central processing unit (CPU) 701 (which may include one or more computer readable storage mediums), a memory controller 702, one or more processors 703, a peripherals interface 704, RF circuitry 705, audio circuitry 706, a speaker 720, a microphone 721, and an input/output (I/O) subsystem 711 having display controller 712, control circuitry for one or more sensors 713 and input device control 714. These components may communicate over one or more communication buses or signal lines in device 700. It should be appreciated that device 700 is only one example of a portable multifunction device 700, and that device 700 may have more or fewer components than shown, may combine two or more components, or a may have a different configuration or arrangement of the components. The various components shown in FIG. 6 may be implemented in hardware or a combination of hardware and software, including one or more signal processing and/or application specific integrated circuits.

In one embodiment, decoder 710 serves to decode ancillary data embedded in audio signals in order to detect exposure to media. Examples of techniques for encoding and decoding such ancillary data are disclosed in U.S. Pat. No. 6,871,180, titled "Decoding of Information in Audio Signals," issued Mar. 22, 2005, and is incorporated by reference in its entirety herein. Other suitable techniques for encoding data in audio data are disclosed in U.S. Pat. No. 7,640,141 to Ronald S. Kolessar and U.S. Pat. No. 5,764,763 to James M. Jensen, et al., which are incorporated by reference in their entirety herein. Other appropriate encoding techniques are disclosed in U.S. Pat. No. 5,579,124 to Aijala, et al., U.S. Pat. Nos. 5,574,962, 5,581,800 and 5,787,334 to Fardeau, et al., and U.S. Pat. No. 5,450,490 to Jensen, et al., each of which is assigned to the assignee of the present application and all of which are incorporated herein by reference in their entirety.

An audio signal which may be encoded with a plurality of code symbols is received at microphone 721, or via a direct link through audio circuitry 706. The received audio signal may be from streaming media, broadcast, otherwise communicated signal, or a signal reproduced from storage in a device. It may be a direct coupled or an acoustically coupled signal. From the following description in connection with the accompanying drawings, it will be appreciated that decoder 710 is capable of detecting codes in addition to those arranged in the formats disclosed hereinabove.

Alternately or in addition, processor(s) 703 can processes the frequency-domain audio data to extract a signature therefrom, i.e., data expressing information inherent to an audio signal, for use in identifying the audio signal or obtaining other information concerning the audio signal (such as a source or distribution path thereof). Suitable techniques for extracting signatures include those disclosed in U.S. Pat. No. 5,612,729 to Ellis, et al. and in U.S. Pat. No. 4,739,398 to Thomas, et al., both of which are incorporated herein by reference in their entireties. Still other suitable techniques are the subject of U.S. Pat. No. 2,662,168 to Scherbatskoy, U.S. Pat. No. 3,919,479 to Moon, et al., U.S. Pat. No. 4,697,209 to Kiewit, et al., U.S. Pat. No. 4,677,466 to Lert, et al., U.S. Pat. No. 5,512,933 to Wheatley, et al., U.S. Pat. No. 4,955,070 to Welsh, et al., U.S. Pat. No. 4,918,730 to Schulze, U.S. Pat. No. 4,843,562 to Kenyon, et al., U.S. Pat. No. 4,450,551 to Kenyon, et al., U.S. Pat. No. 4,230,990 to Lert, et al., U.S. Pat. No. 5,594,934 to Lu, et al., European Published Patent Application EP 0887958 to Bichsel, PCT Publication WO02/11123 to Wang, et al. and PCT publication WO91/11062 to Young, et al., all of which are incorporated herein by reference in their entireties. As discussed above, the code detection and/or signature extraction serve to identify and determine media exposure for the user of device 700.

Memory 708 may include high-speed random access memory (RAM) and may also include non-volatile memory, such as one or more magnetic disk storage devices, flash memory devices, or other non-volatile solid-state memory devices. Access to memory 708 by other components of the device 700, such as processor 703, decoder 710 and peripherals interface 704, may be controlled by the memory controller 702. Peripherals interface 704 couples the input and output peripherals of the device to the processor 703 and memory 708. The one or more processors 703 run or execute various software programs and/or sets of instructions stored in memory 708 to perform various functions for the device 700 and to process data. In some embodiments, the peripherals interface 704, processor(s) 703, decoder 710 and memory controller 702 may be implemented on a single chip, such as a chip 701. In some other embodiments, they may be implemented on separate chips.

The RF (radio frequency) circuitry 705 receives and sends RF signals, also called electromagnetic signals. The RF circuitry 705 converts electrical signals to/from electromagnetic signals and communicates with communications networks and other communications devices via the electromagnetic signals. The RF circuitry 705 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 705 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

Audio circuitry 706, speaker 720, and microphone 721 provide an audio interface between a user and the device 700. Audio circuitry 706 may receive audio data from the peripherals interface 704, converts the audio data to an electrical signal, and transmits the electrical signal to speaker 720. The speaker 720 converts the electrical signal to human-audible sound waves. Audio circuitry 706 also receives electrical signals converted by the microphone 721 from sound waves, which may include encoded audio, described above. The audio circuitry 706 converts the electrical signal to audio data and transmits the audio data to the peripherals interface 704 for processing. Audio data may be retrieved from and/or transmitted to memory 708 and/or the RF circuitry 705 by peripherals interface 704. In some embodiments, audio circuitry 706 also includes a headset jack for providing an interface between the audio circuitry 706 and removable audio input/output peripherals, such as output-only headphones or a headset with both output (e.g., a headphone for one or both ears) and input (e.g., a microphone).

I/O subsystem 711 couples input/output peripherals on the device 700, such as touch screen 715 and other input/control devices 717, to the peripherals interface 704. The I/O subsystem 711 may include a display controller 712 and one or more input controllers 714 for other input or control devices. The one or more input controllers 714 receive/send electrical signals from/to other input or control devices 717. The other input/control devices 717 may include physical buttons (e.g., push buttons, rocker buttons, etc.), dials, slider switches, joysticks, click wheels, and so forth. In some alternate embodiments, input controller(s) 714 may be coupled to any (or none) of the following: a keyboard, infrared port, USB port, and a pointer device such as a mouse, an up/down button for volume control of the speaker 720 and/or the microphone 721. Touch screen 715 may also be used to implement virtual or soft buttons and one or more soft keyboards.

Touch screen 715 provides an input interface and an output interface between the device and a user. The display controller 712 receives and/or sends electrical signals from/to the touch screen 715. Touch screen 715 displays visual output to the user. The visual output may include graphics, text, icons, video, and any combination thereof (collectively termed "graphics"). In some embodiments, some or all of the visual output may correspond to user-interface objects. Touch screen 715 has a touch-sensitive surface, sensor or set of sensors that accepts input from the user based on haptic and/or tactile contact. Touch screen 715 and display controller 712 (along with any associated modules and/or sets of instructions in memory 708) detect contact (and any movement or breaking of the contact) on the touch screen 715 and converts the detected contact into interaction with user-interface objects (e.g., one or more soft keys, icons, web pages or images) that are displayed on the touch screen. In an exemplary embodiment, a point of contact between a touch screen 715 and the user corresponds to a finger of the user. Touch screen 715 may use LCD (liquid crystal display) technology, or LPD (light emitting polymer display) technology, although other display technologies may be used in other embodiments. Touch screen 715 and display controller 712 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 712.

Device 700 may also include one or more sensors 716 such as optical sensors that comprise charge-coupled device (CCD) or complementary metal-oxide semiconductor (CMOS) phototransistors. The optical sensor may capture still images or video, where the sensor is operated in conjunction with touch screen display 715. Device 700 may also include one or more accelerometers 707, which may be operatively coupled to peripherals interface 704. Alternately, the accelerometer 707 may be coupled to an input controller 714 in the I/O subsystem 711. The accelerometer is preferably configured to output accelerometer data in the x, y, and z axes.

In some embodiments, the software components stored in memory 708 may include an operating system 709, a communication module 710, a contact/motion module 713, a text/graphics module 711, a Global Positioning System (GPS) module 712, and applications 714. Operating system 709 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components. Communication module 710 facilitates communication with other devices over one or more external ports and also includes various software components for handling data received by the RF circuitry 705. An external port (e.g., Universal Serial Bus (USB), Firewire, etc.) may be provided and adapted for coupling directly to other devices or indirectly over a network (e.g., the Internet, wireless LAN, etc.

Contact/motion module 713 may detect contact with the touch screen 715 (in conjunction with the display controller 712) and other touch sensitive devices (e.g., a touchpad or physical click wheel). The contact/motion module 713 includes various software components for performing various operations related to detection of contact, such as determining if contact has occurred, determining if there is movement of the contact and tracking the movement across the touch screen 715, and determining if the contact has been broken (i.e., if the contact has ceased). Text/graphics module 711 includes various known software components for rendering and displaying graphics on the touch screen 715, including components for changing the intensity of graphics that are displayed. As used herein, the term "graphics" includes any object that can be displayed to a user, including without limitation text, web pages, icons (such as user-interface objects including soft keys), digital images, videos, animations and the like. Additionally, soft keyboards may be provided for entering text in various applications requiring text input. GPS module 712 determines the location of the device and provides this information for use in various applications. Applications 714 may include various modules, including address books/contact list, email, instant messaging, video conferencing, media player, widgets, instant messaging, camera/image management, and the like. Examples of other applications include word processing applications, JAVA-enabled applications, encryption, digital rights management, voice recognition, and voice replication.

Figure 7:
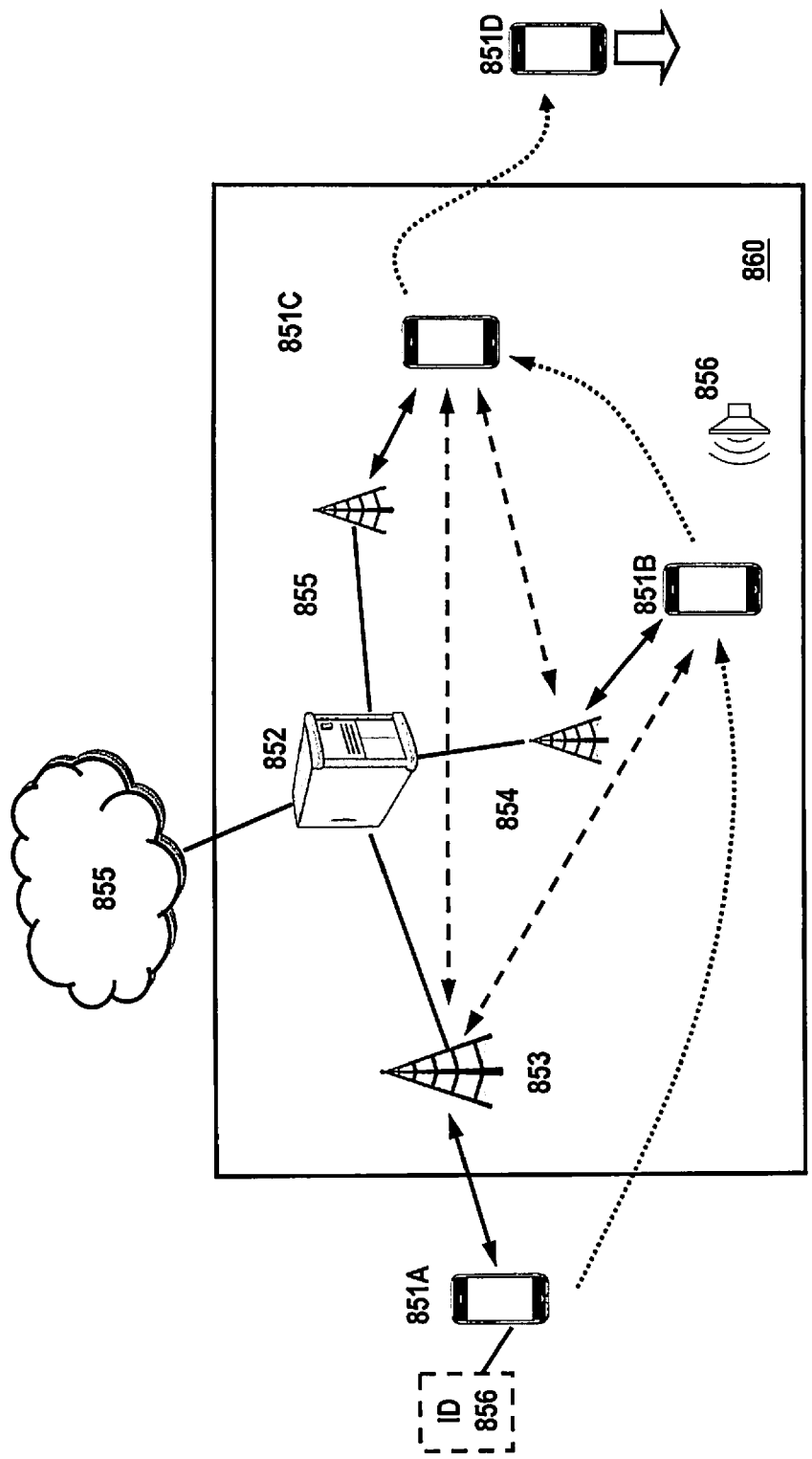
FIG. 7 illustrates another exemplary embodiment of a portable device configured to monitor media data communicating with a plurality of wireless transmitters.

Turning to FIG. 7, embodiments are disclosed for utilizing wireless signals to configure wireless devices, preferably in the area of public places, such as shopping malls, stores, public events, and the like, for gathering research data. In one embodiment, public area 860 comprises at least one higher-range antenna 853 (e.g., class 1, up to 100 meters), together with a plurality of lower-range antennas 854, 855 (e.g., class 2, up to 30 meters) that are communicatively coupled to processor 852. Processor 852 may be a dedicated server, a terminal coupled to one or servers in network 855, or any other suitable device. Processor 852 is capable of sending/receiving data through any or all antennas 853-855. Preferably, processor 852 is configured to independently send and/or receive data through all connected antennas. Processor 852 may further send and/or receive data from network 855 via a dedicated connection such as TCP/IP.

Preferably, each antenna (transmitter/transceiver) in FIG. 7 supplies its own piconet for connecting devices, and the antennas may be operatively coupled together to form one or more scatternets in area 860. Each device initiates its own entry into an existing piconet by forming a scatternet with the master. Cross-piconet communication can take place without requiring devices to periodically disconnect from one piconet and reconnect to the other. Devices can also participate in store-and-forward messaging, effectively removing any Bluetooth range limits if enough devices are available to relay data. When operating in a scatternet, devices may multiplex between piconets to prevent timeouts. If a device is involved only in ACL traffic across piconets, it can use sniff, hold and park low-power modes to divide its attention between different piconets. If a slave device is a member of two or more piconets, an offsetting sniff interval (e.g., every X slots) may be used to multiplex traffic between piconets. This sniff interval would enable symmetric switching to allow a device to divide its time between different piconets. Additionally a predetermined hold time may be implemented for active piconet connections so that the device could sniff and connect with other piconets.

Instead of using sniff intervals to multiplex between piconets, devices may use the hold and park modes between piconets, although the hold mode may slow switching rates between piconets as this would require a device to hold an active piconet and renegotiate a hold in another piconet before returning to exchange more ACL packets. Preferably, a park mode is used for scatternet members, as this mode provides greater versatility for monitoring piconets for unpark commands and other broadcast packets, and may skip several beacon trains by utilizing a sleep time interval ($N_{Bsleep}$) that is a multiple of beacon interval lengths. This effectively allows a device to offset beacon monitoring times, similar to the sniff mode discussed above. Alternately, a device (acting as a slave in the scatternet), can simply ignore each piconet in turn without informing the respective masters of its temporary exit; as long as the timeout periods are not exceeded, the links should be maintained under normal operating conditions.

During a set-up process, each of antennas 853-855 are provided a unique identification or hash that is communicated each time a wireless connection is made with a device (e.g., via module 705 illustrated in FIG. 6). Device 851A preferably stores a list of antenna ID's 856, that may be supplied via a wireless global "push," or alternately provided by a local wireless source, such as long-range antenna 853. ID information 856 may be used by device 851A to identify specific antennas for adjusting operational characteristics. For the purposes of clarification, FIG. 7 illustrates an example of a device (851) being carried through an area 860 at four discreet locations, involving four different events; each of these locations/events for the device are designated as 851A-851D, respectively. It is understood that, in addition to receiving a wireless signal and ID, additional information may be provided in the wireless signal, such as messages or commands. Each antenna may have specific messages or commands that may be sent to the device and processed within the device to modify the operational characteristics described herein.

In the embodiment of FIG. 7, device 851A is physically carried by a user through public area 860. Prior to entering area 860, device 851A is arranged to have a default configuration where, in one embodiment, a predetermined wireless scan rate is set (e.g., once every 5 minutes) and an audio capture capabilities are set to "OFF." As device 851A approaches area 860, it comes into communication range with long-range antenna 853. In the case of Bluetooth communication, antenna 853 is configured to be the master. Once initial communication is established, antenna 853 transmits its ID to device 851A, and the ID is compared to a stored ID to determine if there is a match. Once the ID is matched, this triggers device 851A to update scanning intervals to a higher frequency (e.g., once every 30 seconds) as device 851A enters area 860. Once inside area 860, the device moves to 851B, where it now establishes communication with antenna 854, where it may now form a scatternet together with antenna 853. Again, if the ID for antenna 854 is matched, a new operation may be triggered or an existing operation may be further updated. In this example, the ID received from antenna 854 causes device 851B to activate processes on the device via software and/or hardware. In one embodiment, audio processing is activated (e.g., via DSP/ decoder 710 and microphone 721 of FIG. 6) to activate audio processing on the device to detect ancillary code in audio and/or extract audio signatures. Such a configuration is particularly advantageous in an area where detection of audio media exposure is important; once the activation is completed, device 851B is able to collect research data pertaining to audio 856 or an audio component of other media in the vicinity of 854. Additionally, environmental audio signatures may be extracted to establish and/or confirm the location of device 851B. Techniques for collecting and processing environmental audio signatures is described in U.S. patent application Ser. No. 13/341,453, titled "System and Method for Determining Contextual Characteristics of Media Exposure Data" filed Dec. 30, 2011, which is assigned to the assignee of the present application and is incorporated by reference in its entirety herein.

As device approaches 851C, it next establishes communication with antenna 855 and receives the antenna ID. If the ID matches, device 851C further updates the operating characteristics. In this example, the ID match may trigger device 851C to turn off audio monitoring. Additionally, the ID match from 855 may further update the scanning mode of device 851C to scan for wireless connections more or less frequently. As device 851D moves outside area 860, it eventually loses its wireless connection to the antennas and as a result, reverts back to a default mode of operation.

Figure 8:
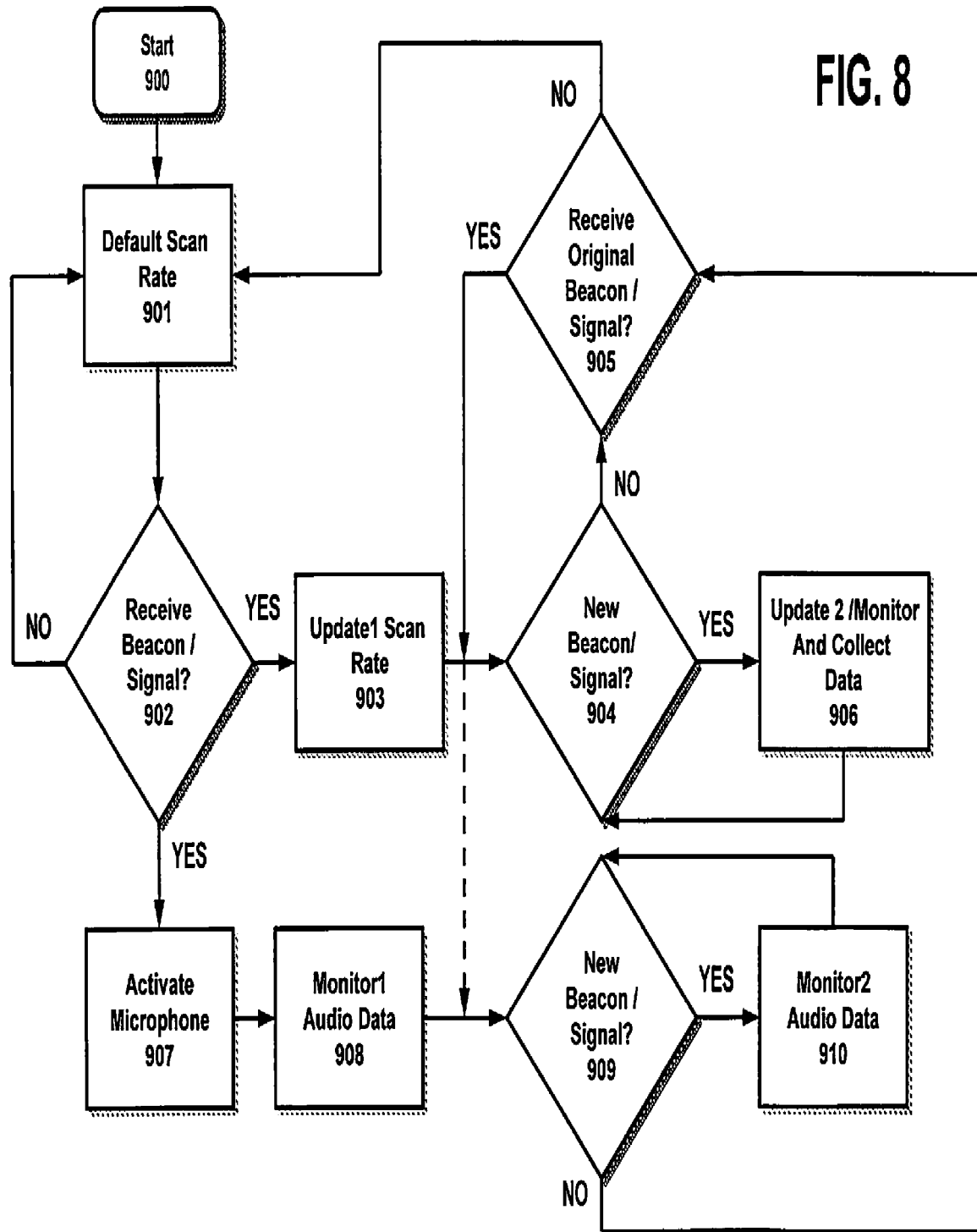
FIG. 8 is an exemplary flow diagram of wireless transmitter communication for a portable device under one embodiment.

Turning to FIG. 8, an exemplary flowchart is provided, where, after a portable device powers up, the process begins at 900. At this point, the portable device is preferably set to a default configuration, where a wireless network scan rate is set to a default rate 901. The device periodically monitors to see if the device has receives a beacon or signal in 902, where, if no beacon or signal is received, the device retains its default scan rate 901. However, once a beacon or signal is detected, the scan rate is updated in 903 to a more or less frequent rate. Additionally or alternately, the detection of a beacon or signal in 902 may activate the devices DSP and/or microphone capabilities in 907, where the device would begin an audio monitoring process utilizing codes and/or signatures, described above.

As the scan rate is updated in 903, the device continues to monitor if a new beacon or signal is received in 904. If a new beacon or signal is not received, the device checks to see if the original beacon is being received in 905. If the original beacon or signal is not being received, the device reverts back to a default scan rate in 901. However, if the original beacon or signal is still being received, the device maintains the updated scan rate (903) and continues to monitor for new beacons or signals. As an example, device 851A of FIG. 7 may establish a connection with long-range antenna 853 while moving past area 860, but the device does not enter area 860. As a result, no further connections will be made with antennas 854-855. Once device 851A moves outside the communication range of 853, the beacon or signal will be lost and device 851A simply reverts back to its default mode of operation. However, as device 851A enters area 860, it is possible for device 851A to be in a section of area 860 that does not contain shorter-range antennas, or is not yet within range of antennas 854 or 855. In such a case, the device will maintain the updated scan rate until a new beacon or signal is received. Once a new beacon or signal is received in 904 (e.g., from antenna 854), the scan rate is updated again in 906 and further data may be collected. This process may repeat for each new beacon or signal (e.g. 855) until the device exits the area and no beacons or signals are detected.

In step 902, a detected beacon or signal may also activate the device's DSP and/or microphone 907 whereupon the device begins reading ancillary code or extracting signatures from audio 908. If a new beacon or signal is detected in 909 (note: the beacon or signal in 909 may be the same beacon or signal as 904), the audio monitoring configuration is updated in 910. In one embodiment, the audio monitoring update may involve such actions as (1) modifying the characteristics of code detection (e.g., frequencies used, timing, etc.), (2) switching the monitoring from detecting code to extracting signatures and vice versa, (3) switching the method of code detection from one type to another (e.g., from CBET decoding to spread-spectrum, from echo-hiding to wavelet, etc.), (4) switching the method of signature extraction from one type to another (e.g., frequency-based, time-based, a combination of time and frequency), and/or (5) providing supplementary data that is correlated to the audio monitoring (e.g., location, other related media in the location, etc.). Similar to the scanning portion described above, if no additional beacons are detected in 909, the device looks to see if the original beacon or signal is being received. If not, the device reverts back to its original configuration and may turn off audio monitoring. If the original beacon is signal is still being detected, the device maintains its current (updated) audio monitoring configuration and continues to monitor for new beacons or signals. Also, the process for audio monitoring repeats for each new beacon or signal no beacons or signals are detected.

It is understood that the embodiments described above are mere examples, and that the disclosed configurations allow for a multitude of variations. For example, the ID detection may be combines with signal strength measurements described above to allow additional modifications, where scan rates may be incrementally increased or decreased as the signal strength becomes stronger or weaker. Also, scan rates and/or audio monitoring may be triggered only when signal strength exceeds a predetermined threshold. Furthermore, device triggers may be made dependent upon combinations of antenna connections. Thus, connections to a $1^{st}$ and $2^{nd}$ beacon would produce one modification on the device, while a connection to a $1^{st}$, $2^{nd}$ and $3^{rd}$ beacon would produce a new, alternate or additional modification. If the connection to the $2^{nd}$ beacon is lost (leaving a connection only with the $1^{st}$ and $3^{rd}$ beacon), yet another new, alternate or additional modification could be produced. Many such variations may be made under the present disclosure, depending on the needs of the system.

Furthermore, while the exemplary embodiments provided above were discussed in the context of Bluetooth, one skilled in the art would understand that the configurations could be adapted to other wireless technologies as well. For example, Wi-Fi or other technologies compatible with the IEEE 802.11 standard may be used as well. While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A portable device comprising:
   a microphone;
   radio frequency circuitry to:
   scan for radio frequency beacons at a first scanning rate prior to establishment of a first connection with a first radio frequency beacon;
   scan for radio frequency beacons at a second scanning rate different from the first scanning rate after the establishment of the first connection with the first radio frequency beacon; and scan for radio frequency beacons at a third scanning rate different from the second scanning rate after establishment of a second connection with a second radio frequency beacon; and a processor to:
trigger activation of audio monitoring via the microphone in response to the establishment of the first connection via the radio frequency circuitry with the first radio frequency beacon, the audio monitoring to at least one of detect an audio code or generate an audio signature; and update the audio monitoring in response to at least one of (i) the establishment of the second connection via the radio frequency circuitry with the second radio frequency beacon, or (ii) loss of the first connection with the first radio frequency beacon.

2. The portable device of claim 1, wherein to update the audio monitoring, the processor is to turn off the audio monitoring.

3. The portable device of claim 1, wherein the processor is to activate the audio monitoring to have a first configuration, and the processor is to update the audio monitoring to have a second configuration different from the first configuration.

4. The portable device of claim 3, wherein the first configuration is to specify at least one of a first type of code detection or a first type of signature generation to be performed on an output of the microphone, and the second configuration is to specify at least one of a second type of code detection or a second type of signature generation to be performed on the output of the microphone, the second type of code detection different from the first type of code detection, the second type of signature generation different from the first type of signature generation.

5. The portable device of claim 4, wherein the first type of code detection is based on a first plurality of signal frequencies, and the second type of code detection is based on a second plurality of signal frequencies.

6. A portable apparatus comprising:
means for sensing audio;
means for scanning for radio frequency beacons, the means for scanning to:
scan for radio frequency beacons at a first scanning rate prior to establishment of a first connection with a first radio frequency beacon;
scan for radio frequency beacons at a second scanning rate different from the first scanning rate after the establishment of the first connection with the first radio frequency beacon; and
scan for radio frequency beacons at a third scanning rate different from the second scanning rate after establishment of a second connection with a second radio frequency beacon; and
means for performing audio monitoring based on an output of the means for sensing audio, the audio monitoring to at least one of detect an audio code or generate an audio signature, the means for performing audio monitoring to:
trigger activation of the audio monitoring in response to the establishment of the first connection with the first radio frequency beacon; and
update the audio monitoring in response to at least one of (i) the establishment of the second connection with the second radio frequency beacon, or (ii) loss of the first connection with the first radio frequency beacon.

7. The portable apparatus of claim 6, wherein to update the audio monitoring, the means for performing audio monitoring is to turn off the audio monitoring.

8. The portable apparatus of claim 6, wherein the means for performing audio monitoring is to activate the audio monitoring to have a first configuration, and the means for performing audio monitoring is to update the audio monitoring to have a second configuration different from the first configuration.

9. The portable apparatus of claim 8, wherein the first configuration is to specify at least one of a first type of code detection or a first type of signature generation to be performed on the audio, and the second configuration is to specify at least one of a second type of code detection or a second type of signature generation to be performed on the audio, the second type of code detection different from the first type of code detection, the second type of signature generation different from the first type of signature generation.

10. The portable apparatus of claim 9, wherein the first type of code detection is based on a first plurality of signal frequencies, and the second type of code detection is based on a second plurality of signal frequencies.

11. An article of manufacture comprising computer readable instructions that, when executed, cause at least one processor of a portable device to at least:
configure radio frequency circuitry of the portable device to scan for radio frequency beacons at a first scanning rate prior to establishment of a first connection with a first radio frequency beacon;
configure the radio frequency circuitry of the portable device to scan for radio frequency beacons at a second scanning rate different from the first scanning rate after the establishment of the first connection with the first radio frequency beacon;
configure the radio frequency circuitry of the portable device to scan for radio frequency beacons at a third scanning rate different from the second scanning rate after establishment of a second connection with a second radio frequency beacon;
trigger, in the portable device, activation of audio monitoring of an output of a microphone of the portable device in response to the establishment of the first connection via the radio frequency circuitry with the first radio frequency beacon, the audio monitoring to at least one of detect an audio code or generate an audio signature; and
update the audio monitoring in response to at least one of (i) the establishment of the second connection via the radio frequency circuitry with the second radio frequency beacon, or (ii) loss of the first connection with the first radio frequency beacon.

12. The article of manufacture of claim 11, wherein to update the audio monitoring, the instructions cause the at least one processor to turn off the audio monitoring.

13. The article of manufacture of claim 11, wherein the instructions cause the at least one processor to activate the audio monitoring to have a first configuration, and the processor is to update the audio monitoring to have a second configuration different from the first configuration.

14. The article of manufacture of claim 13, wherein the first configuration is to specify at least one of a first type of code detection or a first type of signature generation to be performed on the output of the microphone, and the second configuration is to specify at least one of a second type of code detection or a second type of signature generation to be performed on the output of the microphone, the second type of code detection different from the first type of code detection, the second type of signature generation different from the first type of signature generation.

15. The article of manufacture of claim 14, wherein the first type of code detection is based on a first plurality of signal frequencies, and the second type of code detection is based on a second plurality of signal frequencies.

\* \* \* \* \*